(12) United States Patent
Goto et al.

(10) Patent No.: US 10,759,262 B2
(45) Date of Patent: Sep. 1, 2020

(54) BATTERY PACK

(71) Applicant: TOYOTA JIDOSHA KABUSHIKI KAISHA, Toyota-shi, Aichi-ken (JP)

(72) Inventors: Yutaro Goto, Toyota (JP); Shigeyuki Inoue, Toyota (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 0 days.

(21) Appl. No.: 16/296,862

(22) Filed: Mar. 8, 2019

(65) Prior Publication Data

US 2019/0291558 A1 Sep. 26, 2019

(30) Foreign Application Priority Data

Mar. 22, 2018 (JP) ................ 2018-054652

(51) Int. Cl.
| | |
|---|---|
| *B60K 1/04* | (2019.01) |
| *H01M 2/30* | (2006.01) |
| *H01M 2/34* | (2006.01) |
| *H01M 2/10* | (2006.01) |
| *B60L 50/60* | (2019.01) |
| *B60R 16/02* | (2006.01) |

(52) U.S. Cl.
CPC ............ *B60K 1/04* (2013.01); *B60L 50/66* (2019.02); *B60R 16/0207* (2013.01); *H01M 2/1077* (2013.01); *H01M 2/1083* (2013.01); *H01M 2/30* (2013.01); *H01M 2/34* (2013.01); *B60K 2001/0416* (2013.01); *B60K 2001/0438* (2013.01); *H01M 2220/20* (2013.01)

(58) Field of Classification Search
CPC ... B60K 1/04; B60K 2001/0438; B60L 50/66; B60R 16/0207
See application file for complete search history.

(56) References Cited

U.S. PATENT DOCUMENTS

| | | | |
|---|---|---|---|
| 9,490,460 B2* | 11/2016 | Yanagi | H01M 2/1083 |
| 10,358,169 B2* | 7/2019 | Miller | B62D 25/20 |
| 2011/0068622 A1* | 3/2011 | Ikeno | B60K 1/00 307/10.1 |
| 2012/0018238 A1* | 1/2012 | Mizoguchi | B60K 1/04 180/68.5 |

(Continued)

FOREIGN PATENT DOCUMENTS

| | | |
|---|---|---|
| JP | 2011-65749 A | 3/2011 |
| JP | 2012-113896 A | 6/2012 |

*Primary Examiner* — Brian L Swenson
(74) *Attorney, Agent, or Firm* — Sughrue Mion, PLLC

(57) ABSTRACT

A battery pack includes: a plurality of battery modules arranged side by side along a first direction orthogonal to an up-down direction; a housing case configured to house the plurality of battery modules; a wire harness electrically connected to the plurality of battery modules and routed in the housing case; and a reinforcing portion provided within the housing case and configured to reinforce the housing case. The reinforcing portion includes a plate-shaped portion arranged separately from the plurality of battery modules and extending along the first direction. The plate-shaped portion has a lower surface facing the plurality-of-battery-modules side, and an upper surface located on an opposite side of the lower surface. The wire harness is routed along the upper surface of the plate-shaped portion.

5 Claims, 4 Drawing Sheets

(56) References Cited

U.S. PATENT DOCUMENTS

| | | | | |
|---|---|---|---|---|
| 2013/0162075 A1* | 6/2013 | Chinavare | ............ | H05K 9/0098 |
| | | | | 310/85 |
| 2015/0129334 A1* | 5/2015 | Nagamori | ................ | B60K 1/04 |
| | | | | 180/65.31 |
| 2015/0144414 A1* | 5/2015 | Tanigaki | .................. | B60K 1/04 |
| | | | | 180/291 |
| 2015/0367718 A1* | 12/2015 | Hayashi | ................ | B62D 25/20 |
| | | | | 180/68.5 |
| 2016/0339774 A1* | 11/2016 | Hayashi | .................. | B60K 1/00 |
| 2016/0347183 A1* | 12/2016 | Kusumi | .................. | B60L 11/00 |
| 2018/0086192 A1* | 3/2018 | Ishihara | .................. | B60K 1/04 |

\* cited by examiner

BATTERY PACK

This nonprovisional application is based on Japanese Patent Application No. 2018-054652 filed on Mar. 22, 2018 with the Japan Patent Office, the entire contents of which are hereby incorporated by reference.

BACKGROUND

Field

The present disclosure relates to a battery pack, and particularly to a battery pack mounted on a vehicle.

Description of the Background Art

A battery pack configured to supply electric power to a motor is mounted on a vehicle such as an electric vehicle or a hybrid vehicle. A battery module included in the battery pack includes a cell stack configured by arranging a plurality of cells side by side, and a cable configured by bundling together wirings electrically connected to the plurality of cells.

Each cell forming the cell stack is provided with an exhaust valve configured to discharge gas in the cell when an abnormality occurs and the pressure in the cell becomes high. In the battery module, the exhaust valve provided for each cell is covered with an exhaust duct, and the gas discharged from the exhaust valve flows through the exhaust duct. The gas flowing through the exhaust duct has a high temperature, and thus, when the exhaust duct and the cable are in contact with each other, the cable is easily affected by heat.

For example, Japanese Patent Laying-Open No. 2012-113896 discloses a battery module capable of reducing an influence of heat from high-temperature gas flowing through an exhaust duct.

In the battery module disclosed in Japanese Patent Laying-Open No. 2012-113896, a cover member is provided to be placed over the exhaust duct that covers an exhaust valve provided on an upper surface of an exterior case of a cell, and a cable is arranged on the cover member in an area located above the exhaust valve.

SUMMARY

In recent years, the widespread use of electric vehicles has accelerated. High capacity and high output are required for a battery pack mounted on an electric vehicle. Therefore, the number of mounted battery modules increases and the number of cells increases. As a result, an amount of heat generated from the plurality of cells as a result of charging and discharging increases.

The cover member disclosed in Japanese Patent Laying-Open No. 2012-113896 is provided on the upper surface of the exterior case of the cell so as to be in contact with the exhaust duct. Therefore, when the configuration disclosed in Japanese Patent Laying-Open No. 2012-113896 is applied to routing of a wire harness that connects a plurality of battery modules, and the wire harness is routed so as to be in contact with the plurality of battery modules or the wire harness is routed to a member that is in contact with the plurality of battery modules, it is concerned that the wire harness is easily affected by heat of the gas discharged from the cells and/or heat conducted from the plurality of cells.

In addition, when the number of mounted cells increases as described above, a cell stack increases in size and a battery pack increases in size. When the battery pack increases in size, external shock and the like are likely to be provided, and thus, it is also required to increase the strength of a housing case that houses the battery modules.

The present disclosure has been made in light of the above-described problem, and an object of the present disclosure is to provide a battery pack capable of reducing an influence of heat on a wire harness electrically connected to a battery module, while increasing the strength of a housing case.

A battery pack based on the present disclosure includes: a plurality of battery modules arranged side by side along a first direction orthogonal to an up-down direction; a housing case configured to house the plurality of battery modules; a wire harness electrically connected to the plurality of battery modules and routed in the housing case; and a reinforcing portion provided within the housing case and configured to reinforce the housing case. The reinforcing portion includes a plate-shaped portion arranged separately from the plurality of battery modules and extending along the first direction. The plate-shaped portion has a lower surface facing the plurality-of-battery-modules side, and an upper surface located on an opposite side of the lower surface. The wire harness is routed along the upper surface of the plate-shaped portion.

According to the above-described configuration, the reinforcing portion configured to reinforce the housing case is provided, and thus, the strength of the housing case can be increased. In addition, in the above-described configuration, the plate-shaped portion forming a part of the reinforcing portion extends along the first direction in which the plurality of battery modules are arranged side by side, and is arranged separately from the plurality of battery modules, and the plate-shaped portion has the lower surface facing the plurality-of-battery-modules side, and the upper surface located on the opposite side of the lower surface.

When quick charging and discharging are performed, the plurality of battery modules may in some cases generate and release heat. In addition, when an abnormality occurs, any one of the plurality of battery modules may in some cases generate and release heat. Therefore, the wire harness connected to the plurality of battery modules is routed along the upper surface of the plate-shaped portion, and thus, the heat released from the battery modules can be blocked by the plate-shaped portion. As a result, an influence of the heat on the wire harness connected to the plurality of battery modules can be reduced.

In the battery pack based on the present disclosure, the reinforcing portion may include a plurality of holding portions configured to hold the plate-shaped portion. In this case, the plurality of holding portions are preferably spaced apart from one another and arranged side by side in the first direction. Furthermore, each of the holding portions preferably includes a base portion extending to intersect with the plate-shaped portion on a lower side of the plate-shaped portion and fixed to the housing case, a rising wall portion rising toward the plate-shaped portion from the base portion in an area overlapping with the plate-shaped portion when viewed from above, and a top portion provided on an upper end side of the rising wall portion and fixed to the plate-shaped portion.

According to the above-described configuration, the base portion included in each of the plurality of holding portions arranged side by side along the first direction is fixed to the housing case, and thus, the strength of the housing case can be increased. Furthermore, the top portion provided on the upper end side of the rising wall portion provided to rise from the base portion is fixed to the plate-shaped portion, and thus, the rigidity of the plurality of holding portions can be increased. As a result, the strength of the housing case can be further increased.

In the battery pack based on the present disclosure, each of the battery modules may include a cell stack and a cover member configured to cover at least a part of the cell stack. In this case, the cell stacks, each of which is arranged between the base portions adjacent to each other, are preferably arranged side by side along the first direction, and the cover member preferably includes a bracket portion provided to overlap with the base portion located on at least one of both sides of the cell stack in the first direction. Furthermore, in this case, the bracket portion is preferably fixed to the housing case, together with the base portion.

As in the above-described configuration, the bracket portion provided for the cover member configured to cover at least a part of the cell stack is fixed to the housing case, together with the base portion, in a state where the bracket portion overlaps with the base portion located on at least one of both sides of the cell stack, and thus, the battery module can be fixed to the base portion. As a result, the rigidity of the base portion can be increased and the strength of the housing case can in turn be increased. In addition, the battery module can be stably fixed.

In the battery pack based on the present disclosure, the plurality of battery modules may include a plurality of first battery modules spaced apart from one another and arranged side by side in the first direction, and at least one second battery module arranged above the plurality of first battery modules. In this case, the plate-shaped portion preferably includes a first plate-shaped portion extending along the first direction to overlap with the plurality of first battery modules in an area exposed from the at least one second battery module, and a second plate-shaped portion extending along the first direction to overlap with at least a part of the at least one second battery module, and the wire harness preferably includes a first wire harness electrically connected to the plurality of first battery modules in the area exposed from the at least one second battery module, and a second wire harness electrically connected to the at least one second battery module. Furthermore, the first wire harness is preferably routed along an upper surface of the first plate-shaped portion, and the second wire harness is preferably routed along an upper surface of the second plate-shaped portion.

According to the above-described configuration, the wire harness connected to the plurality of first battery modules that do not overlap with the plurality of second battery modules is routed along the upper surface of the first plate-shaped portion. Therefore, at the time of occurrence of an abnormality, at the time of quick charging, or the like, the heat released from the first battery modules that do not overlap with the second battery modules can be blocked by the first plate-shaped portion. As a result, an influence of the heat on the wire harness connected to the plurality of first battery modules that do not overlap with the plurality of second battery modules can be reduced. In addition, the wire harness connected to the plurality of second battery modules is routed along the upper surface of the second plate-shaped portion. Therefore, at the time of occurrence of an abnormality, at the time of quick charging, or the like, the heat released from the second battery modules can be blocked by the second plate-shaped portion. As a result, an influence of the heat on the wire harness connected to the plurality of second battery modules can be reduced.

The battery pack based on the present disclosure may further include a fixing plate having the at least one second battery module fixed thereto. In this case, the fixing plate is preferably arranged between the plurality of first battery modules in an area overlapping with the at least one second battery module in the up-down direction and the at least one second battery module, and the first plate-shaped portion is preferably connected to the fixing plate.

According to the above-described configuration, the at least one second battery module has a considerable weight. Therefore, by connecting the first plate-shaped portion to the fixing plate having the at least one second battery module fixed thereto, vibrations of the first plate-shaped portion in the up-down direction can be suppressed.

In the battery pack based on the present disclosure, the plate-shaped portion may overlap with central portions of the plurality of battery modules in a second direction orthogonal to the up-down direction and the first direction.

As in the above-described configuration, the plate-shaped portion is arranged to overlap with the central portions of the plurality of battery modules in the second direction, and thus, the wire harness can be routed in a balanced manner and can also be easily connected to the plurality of battery modules.

The foregoing and other objects, features, aspects and advantages of the present disclosure will become more apparent from the following detailed description of the present disclosure when taken in conjunction with the accompanying drawings.

DESCRIPTION OF THE PREFERRED EMBODIMENTS

Figure 1:
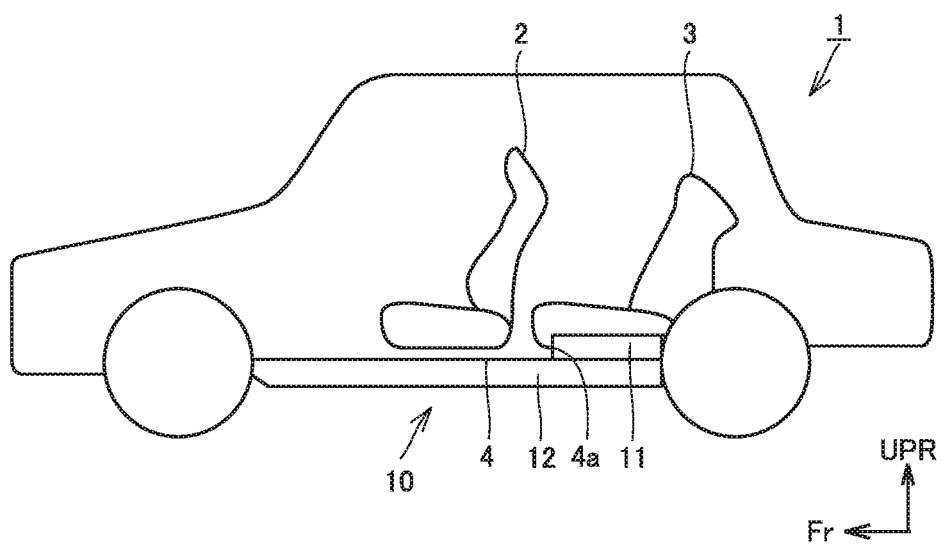
FIG. 1 shows a vehicle on which a battery pack according to an embodiment is mounted.

An embodiment of the present disclosure will be described in detail hereinafter with reference to the drawings. In the embodiment described below, the same or common portions are denoted by the same reference characters in the drawings, and description thereof will not be repeated. When the number, an amount or the like is mentioned in the embodiment described below, the scope of the present disclosure is not necessarily limited to the number, the amount or the like unless otherwise specified.

FIG. 1 shows a vehicle on which a battery pack according to an embodiment is mounted. A vehicle 1 having a battery pack 10 according to the embodiment mounted thereon will be described with reference to FIG. 1.

As shown in FIG. 1, vehicle 1 is, for example, an electric vehicle and includes an electric motor as a prime mover for driving the vehicle. Vehicle 1 includes a front seat 2, a rear seat 3, a floor panel 4, and battery pack 10. Battery pack 10 is configured by electrically serially connecting a plurality of battery modules 30 described below, and thus, battery pack 10 can supply electric power to the electric motor at high output.

Floor panel 4 has an upwardly-bulging portion 4a on the lower side of rear seat 3. Battery pack 10 includes an upper portion 11 and a lower portion 12, and upper portion 11 of battery pack 10 is arranged below bulging portion 4a. Battery pack 10 as a whole is arranged below floor panel 4.

Figure 2:
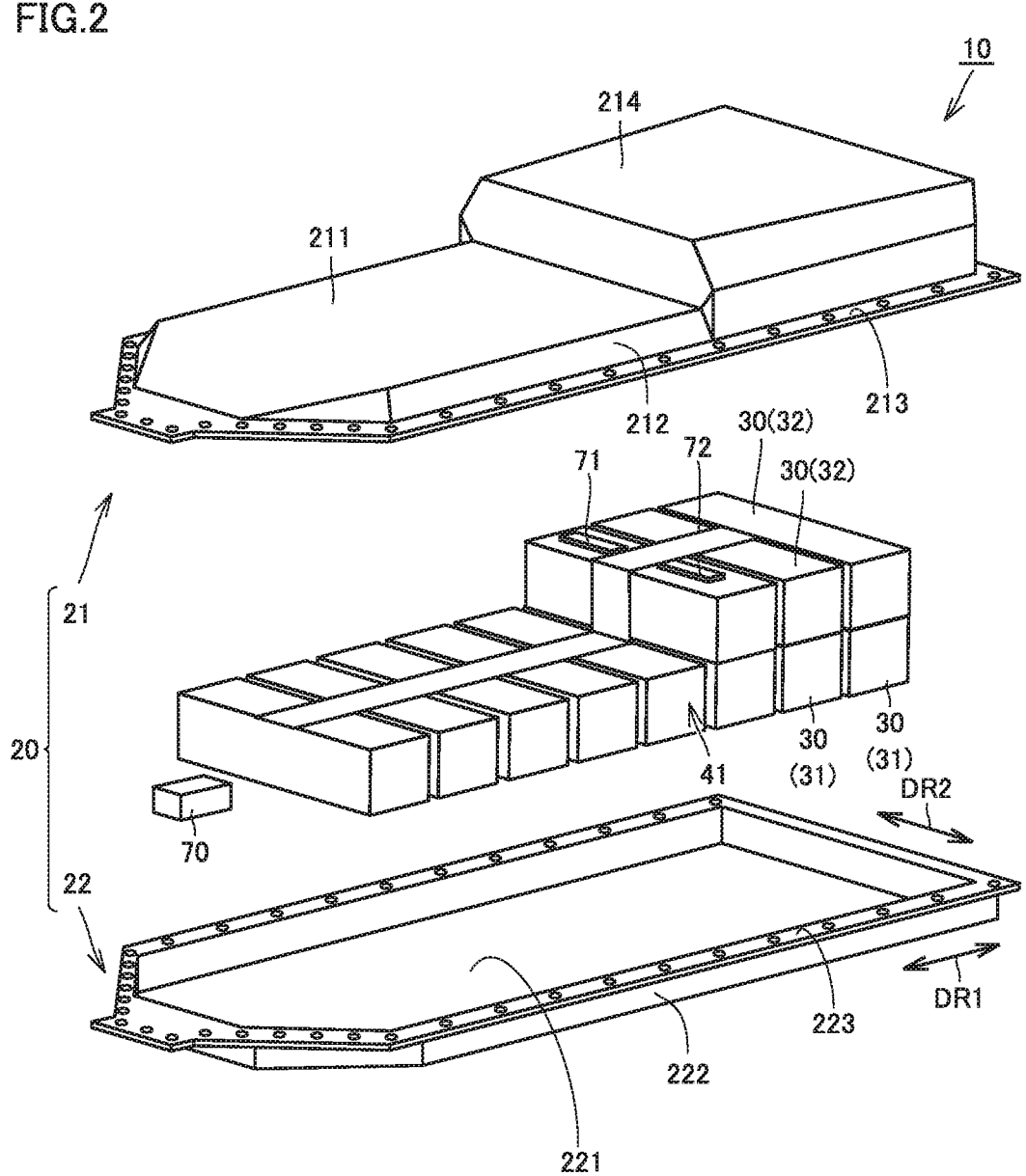
FIG. 2 is an exploded perspective view of the battery pack according to the embodiment.

FIG. 2 is an exploded perspective view of the battery pack according to the embodiment. A configuration of battery pack 10 according to the embodiment will be described with reference to FIG. 2.

As shown in FIG. 2, battery pack 10 includes a housing case 20, a plurality of battery modules 30, a reinforcing portion 50 (see FIG. 3), and electronic devices 70, 71 and 72.

Housing case 20 has a longitudinal shape. Housing case 20 extends along a first direction (DR1 direction). The first direction is orthogonal to an up-down direction, and is parallel to a front-back direction of vehicle 1 in a mounted state in which battery pack 10 is mounted on vehicle 1.

Housing case 20 houses the plurality of battery modules 30, reinforcing portion 50, and electronic devices 70, 71 and 72. Housing case 20 includes an upper case 21 and a lower case 22.

Upper case 21 has a substantially box shape that is open downwardly. Upper case 21 has a ceiling portion 211, a peripheral wall portion 212 and a flange portion 213. Ceiling portion 211 has an upwardly-raised portion 214 on one side in the first direction. A plurality of second battery modules 32 described below are housed in raised portion 214. Raised portion 214 forms upper portion 11 of battery pack 10. Peripheral wall portion 212 is provided to extend from a peripheral edge of ceiling portion 211. Flange portion 213 is provided to bend outward from the lower end side of peripheral wall portion 212.

Lower case 22 has a substantially foil shape that is open upwardly. Lower case 22 has a bottom portion 221, a peripheral wall portion 222 and a flange portion 223. Bottom portion 221 is provided to face ceiling portion 211. Peripheral wall portion 222 is provided to extend upwardly from a peripheral edge of bottom portion 221. Flange portion 223 is provided to bend outward from the upper end side of peripheral wall portion 222.

With a lower surface of flange portion 213 and an upper surface of flange portion 223 being in contact with each other, flange portion 213 and flange portion 223 are fastened by a plurality of fastening members. Upper case 21 and lower case 22 are thus coupled to each other.

The plurality of battery modules 30 include a plurality of first battery modules 31 and a plurality of second battery modules 32. The plurality of first battery modules 31 are spaced apart from one another and arranged side by side in the first direction. Specifically, eight first battery modules 31 are spaced apart from one another and arranged side by side in the first direction.

The plurality of second battery modules 32 are spaced apart from one another and arranged side by side in the first direction. Specifically, three second battery modules 32 are spaced apart from one another and arranged side by side in the first direction. Second battery modules 32 are located above the plurality of first battery modules 31.

First battery module 31 and second battery module 32 have substantially the same configuration. Each of first battery module 31 and second battery module 32 includes a cell stack 33 (see FIG. 6) and an exhaust duct 39 (see FIG. 4).

Cell stack 33 is configured by arranging a plurality of cells C1 (see FIG. 4) side by side along a second direction (DR2 direction). The second direction is orthogonal to the up-down direction and the first direction. The second direction is parallel to the width direction of vehicle 1 in the mounted state in which battery pack 10 is mounted on vehicle 1.

Figure 4:
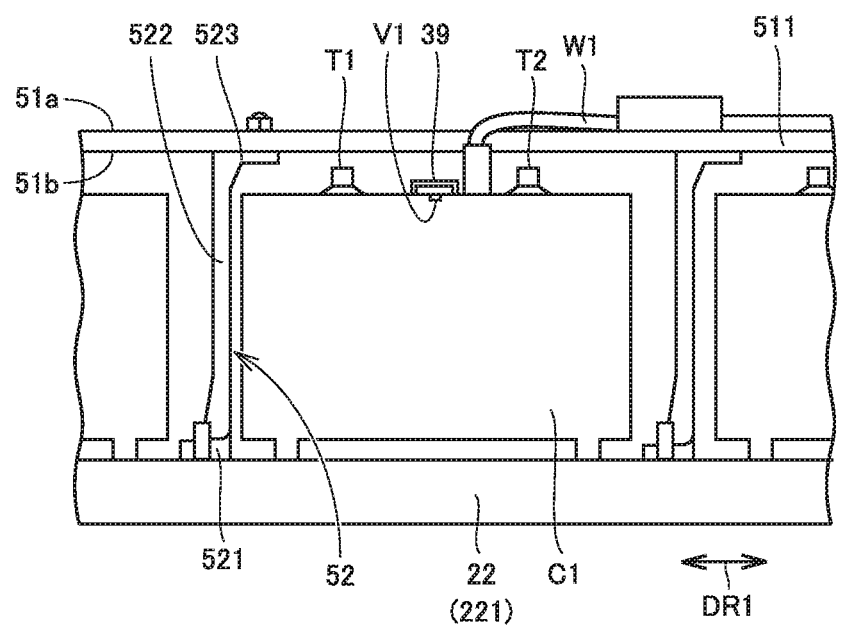
FIG. 4 shows the reinforcing portion and the plurality of battery modules viewed from arrow IV shown in FIG. 3.

Cell C1 has a positive terminal T1 (see FIG. 4) and a negative terminal T2 (see FIG. 4). The plurality of cells C1 are arranged such that positive terminal T1 of one cell C1 and negative terminal T2 of the other cell C1, of cells C1 adjacent to each other, face each other. The plurality of cells C1 are electrically serially connected by a bus bar (not shown).

Cell C1 has a package and an exhaust valve V1 (see FIG. 4) is provided on an upper surface of the package. Exhaust valve V1 is opened when an internal pressure of cell C1 becomes higher than a prescribed pressure, to thereby suppress an increase in internal pressure.

Cell C1 is, for example, a secondary battery such as a nickel-metal hydride battery or a lithium ion battery. Cell C1 has, for example, a rectangular shape. The secondary battery may be a battery including a liquid electrolyte, or a battery including a solid electrolyte.

Exhaust duct 39 extends along the second direction. Exhaust duct 39 is provided to cover a plurality of exhaust valves V1 arranged side by side along the second direction. Exhaust duct 39 is a path for discharging the gas discharged from opened exhaust valves V1 to the outside.

Reinforcing portion 50 is for increasing the strength of housing case 20. A configuration of reinforcing portion 50 will be described below with reference to FIGS. 3 to 5.

Electronic device 70 is arranged on one side (vehicle front side in the mounted state) of housing case 20. Electronic device 70 is arranged above bottom portion 221 of lower case 22. The one end side of electronic device 70 in the first direction is arranged to overlap with flange portion 223 of lower case 22. The other end side of electronic device 70 in the first direction is arranged on the inner side of flange portion 223 of lower case 22.

An opening is provided in flange portion 223 in an area overlapping with the one end side of electronic device 70. A cable drawn from electronic device 70 through the opening is connected to an inverter unit (not shown) and the like arranged on the front side of vehicle 1. As a result, the inverter unit and the like can be easily connected to electronic device 70. Electronic device 70 is, for example, a junction box.

Each of electronic device 71 and electronic device 72 is arranged above second battery modules 32. Electronic device 71 and electronic device 72 are arranged side by side in the second direction. Electronic device 71 monitors a state of the plurality of battery modules 30, for example. Electronic device 71 is, for example, a battery ECU. Electronic device 72 executes charging and discharging control of battery modules 30, based on battery information obtained by electronic device 71. Electronic device 72 is, for example, a BMS (Battery Management System).

Figure 3:
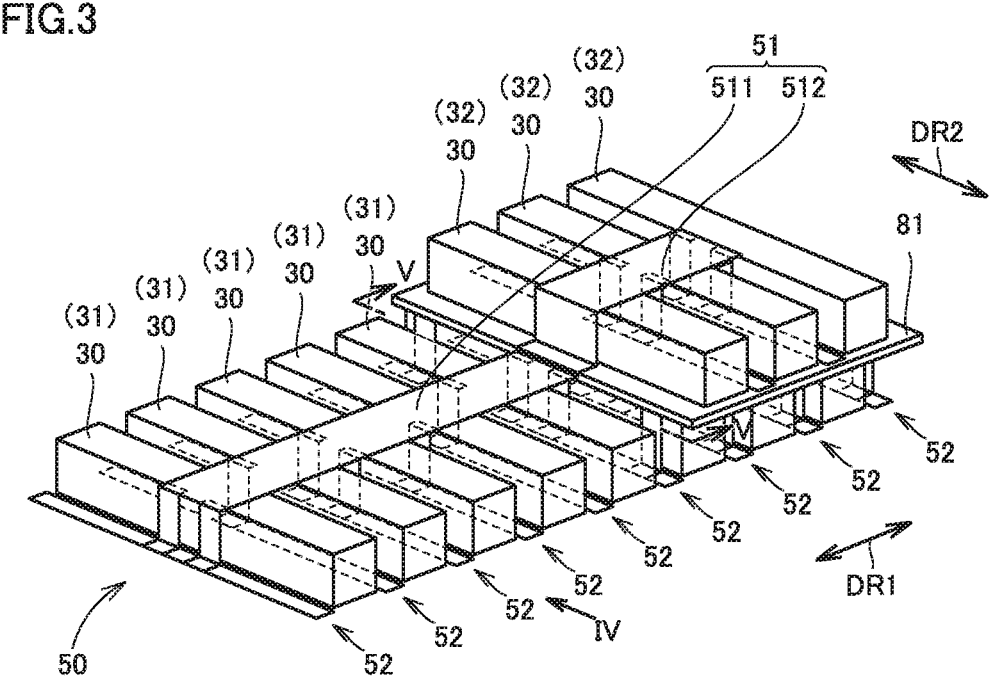
FIG. 3 is a perspective view showing a reinforcing portion and a plurality of battery modules in the battery pack according to the embodiment.

FIG. 3 is a perspective view showing the reinforcing portion and the plurality of battery modules in the battery pack according to the embodiment. FIG. 4 shows the reinforcing portion and the plurality of battery modules viewed from arrow IV shown in FIG. 3. A configuration of reinforcing portion 50 will be described with reference to FIGS. 3 and 4.

As shown in FIGS. 3 and 4, reinforcing portion 50 includes a plate-shaped portion 51 and a plurality of holding portions 52. Plate-shaped portion 51 extends along the first direction. Plate-shaped portion 51 is arranged separately from the plurality of battery modules 30. Plate-shaped portion 51 is arranged to overlap with the plurality of battery modules 30 when viewed from above. Plate-shaped portion 51 is arranged to overlap with central portions of the plurality of battery modules 30 in the second direction.

Plate-shaped portion 51 is arranged above the plurality of battery modules 30 and has an upper surface 51a and a lower surface 51b. Upper surface 51a and lower surface 51b have a front surface-back surface relationship with each other. Upper surface 51a is located on the opposite side of lower surface 51b. Lower surface 51b faces the plurality-of-battery-modules 30 side. Plate-shaped portion 51 has a first plate-shaped portion 511 and a second plate-shaped portion 512.

First plate-shaped portion 511 is arranged separately from the plurality of first battery modules 31. First plate-shaped portion 511 is located above the plurality of first battery modules 31. First plate-shaped portion 511 extends along the first direction to overlap with the plurality of first battery modules 31 in an area exposed from the plurality of second battery modules 32.

Second plate-shaped portion 512 is arranged separately from the plurality of second battery modules 32. Second plate-shaped portion 512 is located above the plurality of second battery modules 32. Second plate-shaped portion 512 extends along the first direction to overlap with a part of the plurality of second battery modules 32.

The plurality of holding portions 52 are spaced apart from one another and arranged side by side in the first direction. The plurality of holding portions 52 include holding portion 52 configured to hold first plate-shaped portion 511, holding portion 52 configured to hold second plate-shaped portion 512, and holding portion 52 configured to hold a fixing plate 81 described below. Respective holding portions 52 have substantially the same configuration. Holding portion 52 has a base portion 521, a rising wall portion 522 and a top portion 523.

Base portion 521 extends to intersect with plate-shaped portion 51 on the lower side of plate-shaped portion 51. Specifically, base portion 521 extends along the second direction.

Base portion 521 of holding portion 52 configured to hold first plate-shaped portion 511 or fixing plate 81 is fixed to bottom portion 221 of lower case 22. Base portion 521 of holding portion 52 configured to hold second plate-shaped portion 512 is fixed to fixing plate 81.

Rising wall portion 522 rises toward plate-shaped portion 51 from base portion 521 in an area overlapping with plate-shaped portion 51 when viewed from above. Top portion 523 is provided on the upper end side of rising wall portion 522. Top portion 523 extends along the first direction. Top portion 523 is fixed to plate-shaped portion 51 or fixing plate 81 by a fastener and the like.

Fixing plate 81 is included in battery pack 10 and has the plurality of second battery modules 32 fixed thereto. Fixing plate 81 is arranged between the plurality of first battery modules 31 in an area overlapping with the plurality of second battery modules 32 in the up-down direction and the plurality of second battery modules 32.

A plurality of base portions 521 are arranged side by side along the first direction and fixed to bottom portion 221 of lower case 22, and thus, the strength of lower case 22 can be increased. Furthermore, top portions 523 provided on rising wall portions 522 that rise from the plurality of base portions 521 are fixed to first plate-shaped portion 511 or fixing plate 81, and thus, the rigidity of the plurality of holding portions 52 can be increased, and as a result, the strength of lower case 22 can be further increased.

Similarly, on fixing plate 81 as well, second plate-shaped portion 512 is fixed to top portions 523 provided on rising wall portions 522 that rise from the plurality of base portions 521, and thus, the rigidity of the plurality of holding portions 52 can be increased.

When the number of stacked cells C1 is increased as an output and a capacity become higher, cells C1 are efficiently arranged and thus a gap between battery modules 30 adjacent to each other becomes narrower. Therefore, first plate-shaped portion 511 is held such that rising wall portion 522 rising from base portion 521 enters the gap between battery modules 30 adjacent to each other. Thus, first plate-shaped portion 511 can be stably held even in a narrow space. Second plate-shaped portion 512 and fixing plate 81 are held in a similar manner, and thus, second plate-shaped portion 512 and fixing plate 81 can be stably held even in a narrow space.

Figure 5:
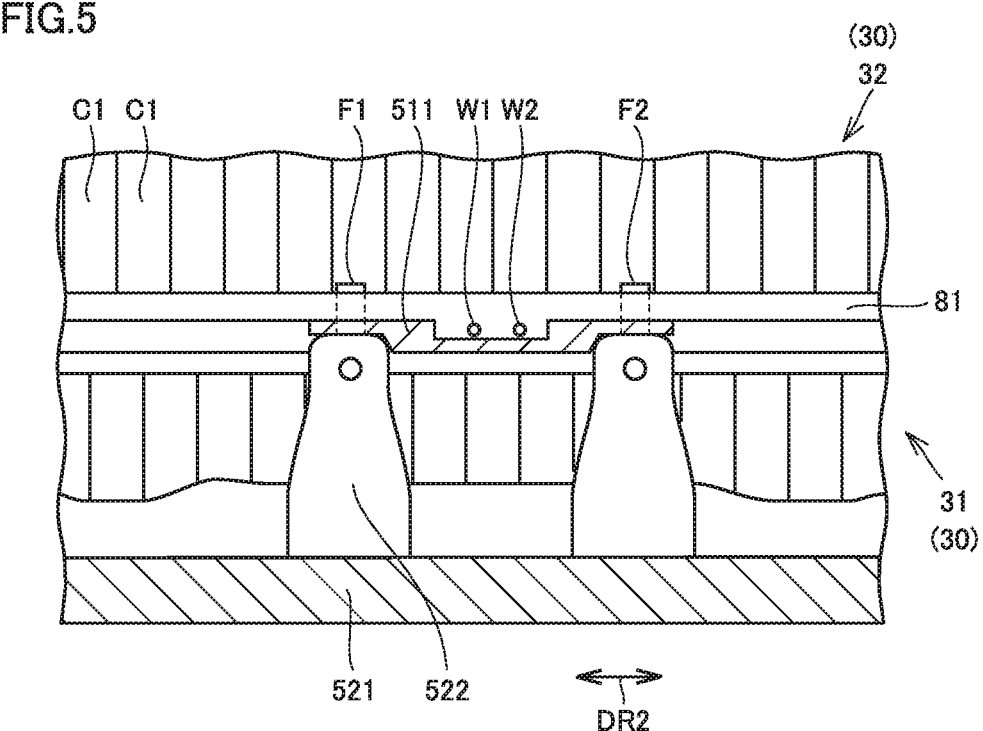
FIG. 5 is a cross-sectional view taken along line V-V shown in FIG. 3, showing a fixation manner of a first plate-shaped portion and a fixing plate to which a plurality of second battery modules are fixed.

FIG. 5 is a cross-sectional view taken along line V-V shown in FIG. 3, showing a fixation manner of the first plate-shaped portion and the fixing plate to which the plurality of second battery modules are fixed.

As shown in FIG. 5, first plate-shaped portion 511 is connected to fixing plate 81. Specifically, an end of first plate-shaped portion 511 located on the fixing plate 81 side is fixed to fixing plate 81 by fasteners F1 and F2 and the like. Fasteners F1 and F2 are fixed to top portions 523 of holding portions 52 that support fixing plate 81.

Fixing plate 81 is held by the plurality of holding portions 52, with the plurality of second battery modules 32 being fixed to fixing plate 81 as described above. The plurality of second battery modules 32 have a considerable weight. Therefore, by fixing a part of first plate-shaped portion 511 to fixing plate 81, vibrations of first plate-shaped portion 511 in the up-down direction can be suppressed.

Furthermore, by fixing the above-described end of first plate-shaped portion 511 to the central portion of fixing plate 81 in the second direction, vibrations of fixing plate 81 in the front-back direction can be suppressed.

Figure 6:
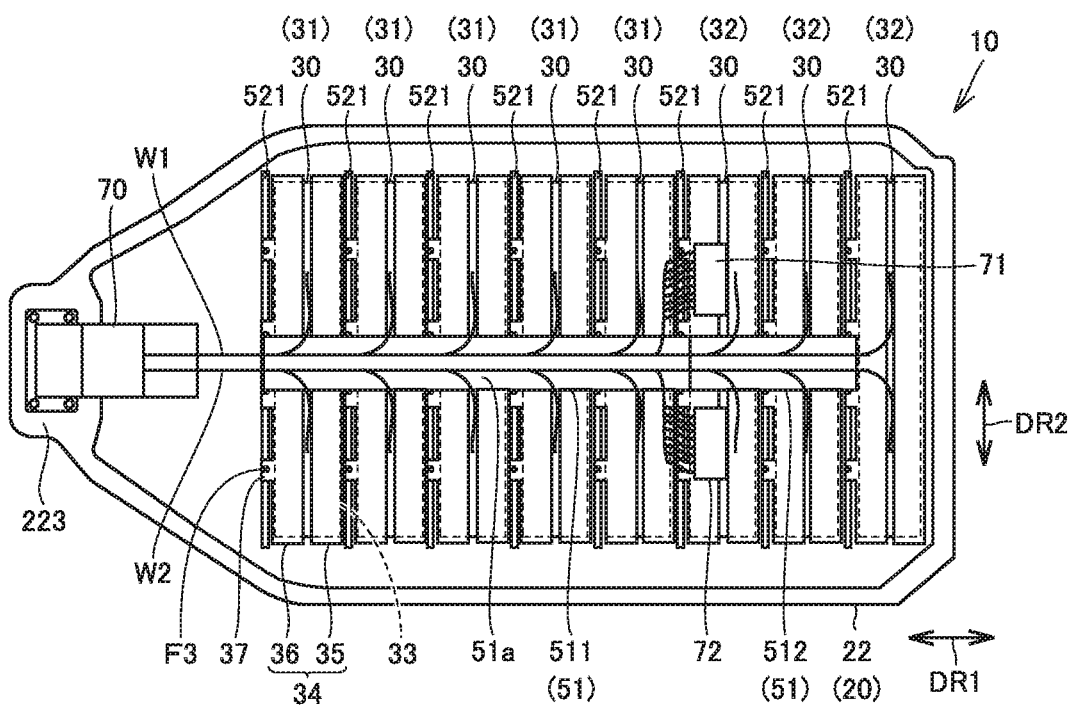
FIG. 6 is a plan view showing a fixation manner of the plurality of battery modules and a routing manner of wire harnesses connected to the plurality of battery modules in the battery pack according to the embodiment.

FIG. 6 is a plan view showing a fixation manner of the plurality of battery modules and a routing manner of wire harnesses connected to the plurality of battery modules in the battery pack according to the embodiment. The fixation manner of the plurality of battery modules 30 and the routing state of wire harnesses W1 and W2 connected to the plurality of battery modules 30 will be described with reference to FIG. 6.

The fixation manner of the plurality of battery modules 30 will be described. As shown in FIG. 6, each battery module 30 includes a cover member 34 configured to cover cell stack 33. Cover member 34 is configured, for example, by arranging spacers, each of which is arranged between cells C1 adjacent to each other, side by side along the second direction. Cover member 34 is fixed to cell stack 33 by a constraint band and the like.

Cover member 34 has a first cover portion 35 and a second cover portion 36. First cover portion 35 mainly covers one side of cell stack 33 in the first direction, and second cover portion 36 mainly covers the other side of cell stack 33 in the first direction.

Second cover portion 36 is provided with a bracket portion 37 such that bracket portion 37 overlaps with base portion 521 located adjacently in the first direction. Bracket portion 37 is fixed to base portion 521 and bottom portion 221 of lower case 22 by a fastener F3 and the like.

Battery module 30 is fixed to base portion 521 as described above, and thus, the rigidity of base portion 521 can be increased and the strength of housing case 20 can in turn be increased. In addition, battery module 30 can be stably fixed.

First cover portion 35 may be provided with bracket portion 37 and bracket portion 37 may be provided to overlap with base portion 521 located on at least one of both sides of cell stack 33 in the first direction. In this case as well, bracket portion 37 is fixed together with base portion 521, and thus, battery module 30 can be stably fixed and the strength of housing case 20 can be increased similarly to the foregoing.

Next, the routing manner of wire harnesses W1 and W2 connected to the plurality of battery modules 30 will be described.

Battery pack 10 includes wire harnesses W1 and W2. Wire harnesses W1 and W2 are routed in housing case 20. Wire harnesses W1 and W2 are connected to the plurality of battery modules 30.

Wire harness W1 connected to the plurality of battery modules 30 is also connected to, for example, electronic device 70 and electronic device 71. Wire harness W2 connected to the plurality of battery modules 30 is also connected to, for example, electronic device 70 and electronic device 72.

Wire harness W1 and wire harness W2 are routed along upper surface 51a of plate-shaped portion 51. Specifically, the wire harness connected to the plurality of first battery modules 31 in the area exposed from the plurality of second battery modules 32 when viewed from above is routed along the upper surface of first plate-shaped portion 511. That is, the wire harness connected to the plurality of first battery modules 31 that do not overlap with the plurality of second battery modules 32 is routed along the upper surface of first plate-shaped portion 511. The wire harness connected to the plurality of second battery modules 32 is routed along the upper surface of second plate-shaped portion 512.

As described above, plate-shaped portion 51 is arranged separately from the plurality of battery modules 30. Furthermore, plate-shaped portion 51 has lower surface 51b facing the plurality-of-battery-modules 30 side, and upper surface 51a located on the opposite side of lower surface 51b.

When an abnormality occurs in at least one of cells C1 included in the plurality of battery modules 30 and the hot-temperature gas is discharged from exhaust valve V1, the heat is released from exhaust duct 39 heated by the gas.

In this case, the wire harness connected to the plurality of battery modules 30 is routed along upper surface 51a of plate-shaped portion 51, and thus, the heat released from exhaust duct 39 can be blocked by plate-shaped portion 51. In addition, when the plurality of battery modules 30 generate heat as a result of quick charging and discharging, the heat released from battery modules 30 can be blocked by plate-shaped portion 51. As a result, an influence of the heat on the wire harness connected to battery modules 30 can be reduced.

Specifically, the wire harness connected to the plurality of first battery modules 31 that do not overlap with the plurality of second battery modules 32 is routed along the upper surface of first plate-shaped portion 511. Therefore, at the time of occurrence of an abnormality, at the time of quick charging, or the like, the heat released from first battery modules 31 that do not overlap with second battery modules 32 can be blocked by first plate-shaped portion 511. As a result, an influence of the heat on the wire harness connected to the plurality of first battery modules 31 that do not overlap with the plurality of second battery modules 32 can be reduced.

The wire harness connected to the plurality of second battery modules 32 is routed along the upper surface of second plate-shaped portion 512. Therefore, at the time of occurrence of an abnormality, at the time of quick charging, or the like, the heat released from second battery modules 32 can be blocked by second plate-shaped portion 512. As a result, an influence of the heat on the wire harness connected to the plurality of second battery modules 32 can be reduced.

In addition, plate-shaped portion 51 is arranged to overlap with the central portions of the plurality of battery modules 30 in the second direction, and thus, the wire harness can be routed in a balanced manner and can also be easily connected to the plurality of battery modules 30.

The embodiment is described above by way of example in connection with the case in which plate-shaped portion 51 is held by the plurality of holding portions 52. However, as long as fixation to housing case 20 is achieved to increase the strength of housing case 20, the fixation manner can be selected as appropriate.

While the embodiment is described above by way of example in connection with the case in which the plurality of second battery modules 32 are provided, the present disclosure is not limited thereto. Single second battery module 32 may be provided.

While the embodiment of the present disclosure has been described, it should be understood that the embodiment disclosed herein is illustrative and non-restrictive in every respect. The scope of the present disclosure is defined by the terms of the claims and is intended to include any modifications within the scope and meaning equivalent to the terms of the claims.

What is claimed is:

1. A battery pack comprising:
   a plurality of battery modules arranged side by side along a first direction orthogonal to an up-down direction;
   a housing case configured to house the plurality of battery modules;
   a wire harness electrically connected to the plurality of battery modules and routed in the housing case; and
   a reinforcing portion provided within the housing case and configured to reinforce the housing case,
   the reinforcing portion including a plate-shaped portion arranged separately from the plurality of battery modules and extending along the first direction,
   the plate-shaped portion having a lower surface facing the plurality-of-battery-modules side, and an upper surface located on an opposite side of the lower surface,
   the wire harness being routed along the upper surface of the plate-shaped portion, wherein
   the reinforcing portion includes a plurality of holding portions configured to hold the plate-shaped portion,
   the plurality of holding portions are spaced apart from one another and arranged side by side in the first direction, and
   each of the holding portions includes a base portion extending to intersect with the plate-shaped portion on a lower side of the plate-shaped portion and fixed to the housing case, a rising wall portion rising toward the plate-shaped portion from the base portion in an area overlapping with the plate-shaped portion when viewed from above, and a top portion provided on an upper end side of the rising wall portion and fixed to the plate-shaped portion.

2. The battery pack according to claim 1, wherein each of the battery modules includes a cell stack and a cover member configured to cover at least a part of the cell stack, the cell stacks, each of which is arranged between the base portions adjacent to each other, are arranged side by side along the first direction, the cover member includes a bracket portion provided to overlap with the base portion located on at least one of both sides of the cell stack in the first direction, and the bracket portion is fixed to the housing case, together with the base portion.

3. The battery pack according to claim 1, wherein the plurality of battery modules include a plurality of first battery modules spaced apart from one another and arranged side by side in the first direction, and at least one second battery module arranged above the plurality of first battery modules, the plate-shaped portion includes a first plate-shaped portion extending along the first direction to overlap with the plurality of first battery modules in an area exposed from the at least one second battery module, and a second plate-shaped portion extending along the first direction to overlap with at least a part of the at least one second battery module, the wire harness includes a first wire harness electrically connected to the plurality of first battery modules in the area exposed from the at least one second battery module, and a second wire harness electrically connected to the at least one second battery module, the first wire harness is routed along an upper surface of the first plate-shaped portion, and the second wire harness is routed along an upper surface of the second plate-shaped portion.

4. The battery pack according to claim 3, further comprising a fixing plate having the at least one second battery module fixed thereto, wherein the fixing plate is arranged between the plurality of first battery modules in an area overlapping with the at least one second battery module in the up-down direction and the at least one second battery module, and the first plate-shaped portion is connected to the fixing plate.

5. The battery pack according to claim 1, wherein the plate-shaped portion overlaps with central portions of the plurality of battery modules in a second direction orthogonal to the up-down direction and the first direction.

* * * * *